US008335907B2

(12) United States Patent
Sinclair et al.

(10) Patent No.: US 8,335,907 B2
(45) Date of Patent: Dec. 18, 2012

(54) MICRO-UPDATE ARCHITECTURE FOR ADDRESS TABLES

(75) Inventors: Alan W. Sinclair, Falkirk (GB); Nicholas J. Thomas, Dundee (GB)

(73) Assignee: SanDisk Technologies Inc., Plano, TX (US)

( * ) Notice: Subject to any disclaimer, the term of this patent is extended or adjusted under 35 U.S.C. 154(b) by 221 days.

(21) Appl. No.: 12/650,182

(22) Filed: Dec. 30, 2009

(65) Prior Publication Data
US 2011/0161621 A1 Jun. 30, 2011

(51) Int. Cl.
*G06F 12/00* (2006.01)
(52) U.S. Cl. ............ 711/206; 711/165; 711/E12.014
(58) Field of Classification Search .......... 711/206, 711/165, E12.014
See application file for complete search history.

(56) References Cited

U.S. PATENT DOCUMENTS

| 6,112,286 | A | 8/2000 | Schimmel et al. | |
|---|---|---|---|---|
| 7,603,530 | B1 * | 10/2009 | Liikanen et al. | 711/162 |
| 2005/0144357 | A1 * | 6/2005 | Sinclair | 711/103 |
| 2007/0101095 | A1 * | 5/2007 | Gorobets | 711/203 |
| 2011/0161621 | A1 * | 6/2011 | Sinclair et al. | 711/207 |

FOREIGN PATENT DOCUMENTS

| JP | 2009-205689 A | 9/2009 |
|---|---|---|
| WO | 03/027828 A1 | 4/2003 |

OTHER PUBLICATIONS

International Search Report issued in international application No. PCT/US2010/061283, mailed Mar. 23, 2011 (7 pages).
Written Opinion issued in international application No. PCT/US2010/061283, mailed Mar. 23, 2011 (8 pages).
Gesan Wang and Nian-Feng Tzeng: TCAM-Based Forwarding Engine with Minimum Independent Prefix Set (MIPS) for Fast Updating, Center for Advanced Studies, University of Louisiana at Lafayette, Jun. 2006, 7 pages.
International Preliminary Report on Patentability issued in international application No. PCT/US2010/061283, dated Jul. 4, 2012 (14 pages).

* cited by examiner

*Primary Examiner* — Edward Dudek, Jr.
(74) *Attorney, Agent, or Firm* — Brinks Hofer Gilson & Lione

(57) ABSTRACT

Methods of maintaining an address table for mapping logical addresses to physical addresses include continuously consolidating main address maps and an update address map, and periodically compacting the update address map. Consolidating includes selecting a main address map, reading valid mapping entries from the main and update address maps, constructing a mapping set including the valid mapping entries, and writing the mapping set to a second main address map. The update address map is compacted if a criterion is met, and includes copying the valid mapping entries to an unwritten block or metablock and assigning the unwritten block or metablock as a new update address map. The length of consolidation may depend on the average length of compacted mapping entries following a compaction operation. Increased performance due to lower maintenance overhead may result by using these methods.

23 Claims, 11 Drawing Sheets

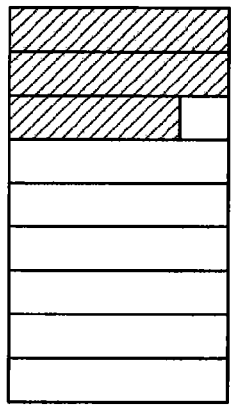 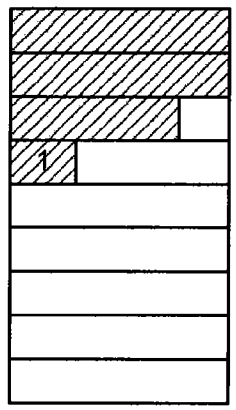 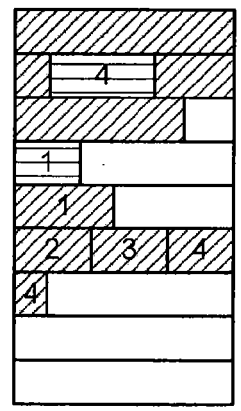
Fig. 12A        Fig. 12B        Fig. 12C
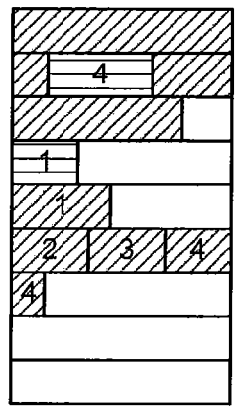 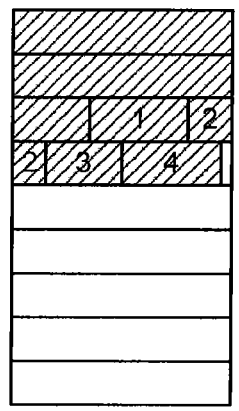
Fig. 13A        Fig. 13B

MICRO-UPDATE ARCHITECTURE FOR ADDRESS TABLES

TECHNICAL FIELD

This application relates generally to memory devices. More specifically, this application relates to maintenance of address tables used for mapping logical addresses to physical addresses in reprogrammable non-volatile semiconductor flash memory.

BACKGROUND

Non-volatile memory systems, such as flash memory, have been widely adopted for use in consumer products. Flash memory may be found in different forms, for example in the form of a portable memory card that can be carried between host devices or as a solid state disk (SSD) embedded in a host device. When writing data to a conventional flash memory system, a host typically writes data to, and reads data from, addresses within a logical address space of the memory system. The memory system then commonly maps data between the logical address space and the physical blocks or meta-blocks of the memory, where data is stored in fixed logical groups corresponding to ranges in the logical address space. Each fixed logical group may be stored in a separate physical block of the memory system or may be stored in runs of physical memory location in multiple physical blocks or metablocks. The memory system keeps track of how the logical address space is mapped into the physical memory but the host is unaware of this. The host keeps track of the addresses of its data files within the logical address space but the memory system generally operates without knowledge of this mapping. The mapping information is typically stored in an address table indexed such that each of the logical groups or logical address runs in the logical address space is mapped to a physical address run.

Mapping information is updated when data is modified or deleted and/or new data is written, for example. In typical memory systems, when mapping information needs to be updated, the full set of mapping entries, where the set is for a logical group, in the address table is rewritten. For example, in the scenario where the minimum size of a mapped data run is 4 KB and the memory system is fully fragmented into minimum-sized data runs, and each logical group occupies 8 MB, each logical group is mapped to 2048 unrelated physical address runs, and the set of mapping entries in the address table for a logical group occupies 16 KB. Accordingly, if the full set of mapping entries for a logical group is rewritten in the address table, up to 16 KB of space is used for the mapping entries and up to 16 KB of obsolete space is created. The obsolete space would be unusable until it is reclaimed.

Accordingly, in a memory system with high fragmentation and random 4 KB data being written, there is a unreasonable amount of overhead related to updating mapping entries in the address table and relocating data to reclaim obsolete space. The overhead incurred in such a memory system significantly affects the write performance and write amplification ratio (i.e., the ratio of the amount of data programmed, including internal copying/movement of data, relative to the amount of data written by a host) of the memory system. Lower performance and reduced device lifetime for the memory system may result.

SUMMARY

In order to address the problems noted above, a method for maintaining address tables used for mapping logical addresses to physical addresses is disclosed.

According to a first aspect of the invention, a method is disclosed for maintaining an address table in a memory device, where the address table includes a plurality of main address maps and an update address map. The method includes selecting a first main address map from the plurality of main address maps, where the first main address map relates to a first logical address range. The method also includes reading valid main mapping entries from the first main address map and valid update mapping entries from the update address map. The valid main and update mapping entries specify an address mapping of logical address runs to physical address runs in the memory device. The valid update mapping entries supersede their corresponding invalid main mapping entries. The method further includes constructing a main mapping set, which may be related to a logical group, where the main mapping set includes the valid main and update mapping entries. The constructed main mapping set is written to a second main address map of the plurality of main address maps.

Selecting the first main address map may include identifying the first main address map based on an order of the first logical address range relative to other logical address ranges. The method may further include compacting the update address map when it meets a compaction criterion, calculating an average length of valid update mapping entries based on a predetermined number of previous executions of the compacting step, comparing the average length to a target length, and performing the selecting, reading, constructing, and writing steps for a range of logical addresses (also referred to as a length) based on the comparison. Performing the selecting, reading, constructing, and writing steps may include increasing the length if the average length exceeds the target length, and decreasing the length if the average length does not exceed the target length. Constructing the main mapping set may include invalidating the valid update mapping entries in the update address map.

The method may further include reading an index entry from an index table for a logical group in a first logical address range. Reading the index entry may include reading a main mapping set index and an update mapping set index in the index entry. The main mapping set index may include a location and length of the main mapping set in the first main address map. The update mapping set index may include a location and length of an update mapping set in the update address map, where the update mapping set includes the valid update mapping entries. Writing the main mapping set may include writing the index entry to the index table for the logical group, and writing the index entry may include writing a main mapping set index in the index entry, and clearing an update mapping set index in the index entry. The main mapping set index may include a location and length of the main mapping set in the second main address map. Alternatively, the method may read an update mapping index set pointer in the index entry, which includes a location of the update mapping set index in the update address map. The update mapping set index may include a location and length of the update mapping set in the update address map.

Writing the main mapping set may include padding the main mapping set with null data if the main mapping set does not fill the second main address map. Writing the main mapping set may also include writing the main mapping set to the second main address map relating to a second logical address range that at least partially overlaps the first logical address range. Writing the main mapping set may further include writing the main mapping set to the second main address map in logical group order. Reading the valid main and update mapping entries may include reading the valid main mapping entries from the first main address map stored in a non-volatile memory, and reading the valid update mapping entries from the update address map stored in the non-volatile memory. Writing the main mapping set may include writing the main mapping set to the second main address map stored in the non-volatile memory.

According to another aspect, a method is disclosed for maintaining an address table in a memory device, where the address table includes a plurality of main address maps and an update address map. The method includes writing a mapping entry to the update address map, where the mapping entry specify an address mapping of logical address runs to physical address runs in the memory device. The method also includes determining whether the update address map meets a compaction criterion. If the update address map meets the compaction criterion, then the method copies the valid update mapping entries in the update address map to a first unwritten block or metablock in the memory device, assigns the first unwritten block or metablock as a new update address map, and designates the update address map as a second unwritten block or metablock. The valid update mapping entries are copied contiguously and in address order.

Determining whether the update address map meets the compaction criterion may include determining whether the update address map has reached full capacity or a predetermined capacity less than the full capacity. The method may also include consolidating the plurality of main address maps with the update address map, calculating an average length of valid update mapping entries based on previous executions of the consolidating step, comparing the average length to a target length, and performing the consolidating step for a range of logical addresses (also referred to as length) based on the comparison. Performing the consolidating step may include increasing the length if the average length exceeds the target length, and decreasing the length if the average length does not exceed the target length.

Writing the mapping entry to the update address map may include reading the valid update mapping entries in the update address map and writing an update mapping set to the update address map, where the update mapping set may be related to a logical group and includes the mapping entry and the valid update mapping entries. Writing the update mapping set may include padding the update mapping set with null data if the update mapping set does not fill a page of the update address map.

The method may further include reading an index entry from an index table for a logical group in the first logical address range. Reading the index entry may include reading an update mapping set index in the index entry. The update mapping set index may include a location and length of an update mapping set in the update address map, where the update mapping set includes the valid update mapping entries. Copying the valid update mapping entries may include writing the index entry to the index table for the logical group. Writing the index entry may include updating an update mapping set index in the index entry, where the update mapping set index includes a location and length of the update mapping set in the update address map. Alternatively, the method may read an update mapping index set pointer in the index entry, which includes a location of the update mapping set index in the update address map. The update mapping set index may include a location and length of the update mapping set in the update address map. Writing the mapping entry to the update address map may include writing the mapping entry to the update address map stored in a non-volatile memory, and copying the valid update mapping entries to the first unwritten block or metablock may include copying writing the valid update mapping entries to the first unwritten block or metablock in the non-volatile memory.

BRIEF DESCRIPTION OF THE DRAWINGS

FIGS. 12A-C illustrate exemplary update address maps undergoing writing of mapping entries.

FIGS. 13A and 13B illustrate an exemplary update address map undergoing compaction.

BRIEF DESCRIPTION OF THE PRESENTLY PREFERRED EMBODIMENTS

Figure 1:
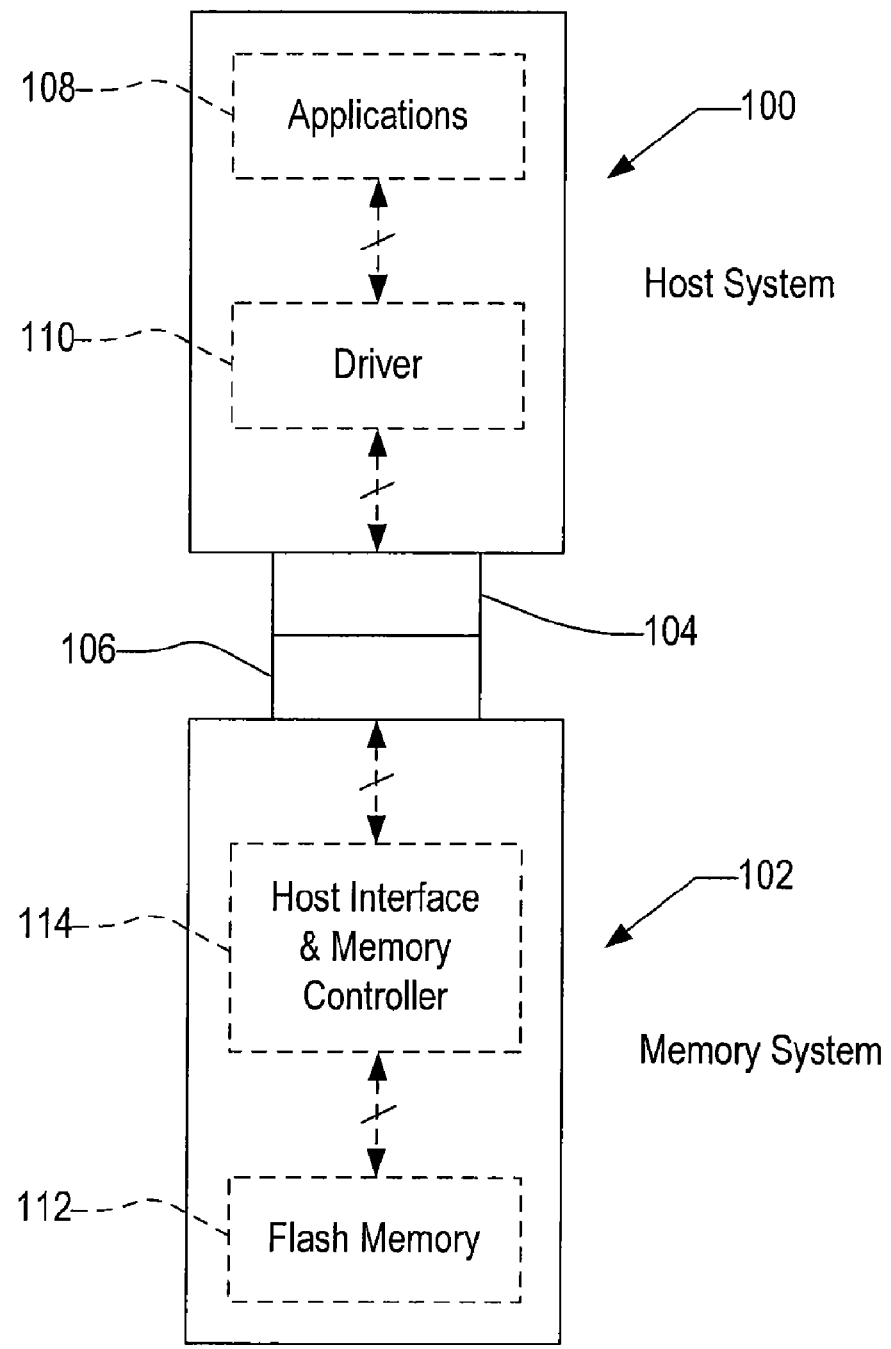
FIG. 1 is a block diagram of a host connected with a memory system having non-volatile memory.
Figure 2:
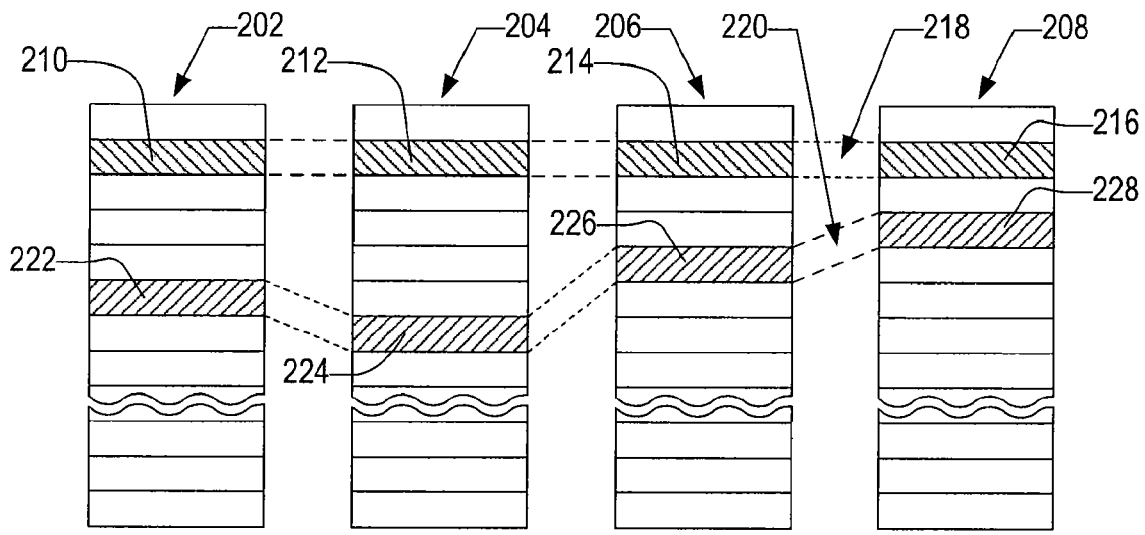
FIG. 2 illustrates an example physical memory organization of the system of FIG. 1.
Figure 3:
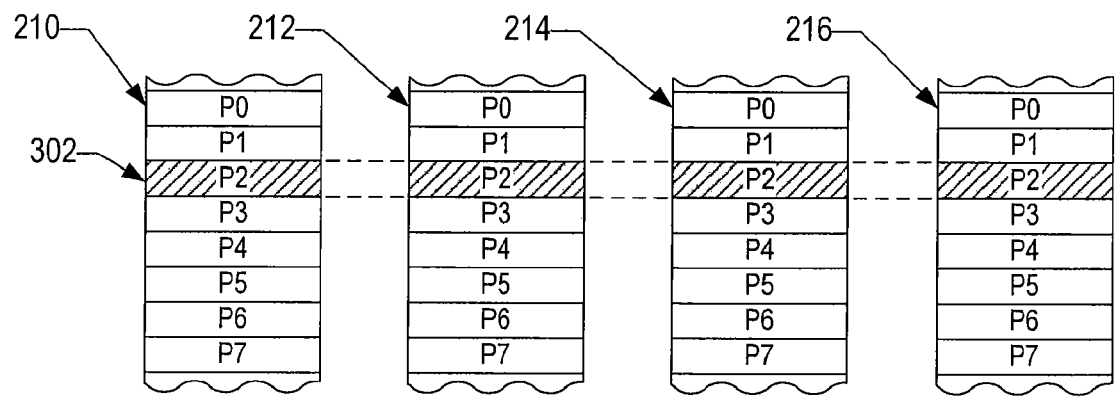
FIG. 3 shows an expanded view of a portion of the physical memory of FIG. 2.

A flash memory system suitable for use in implementing aspects of the invention is shown in FIGS. 1-3. A host system 100 of FIG. 1 stores data into and retrieves data from a flash memory 102. The flash memory may be embedded within the host, such as in the form of a solid state disk (SSD) drive installed in a personal computer. Alternatively, the memory 102 may be in the form of a card that is removably connected to the host through mating parts 104 and 106 of a mechanical and electrical connector as illustrated in FIG. 1. A flash memory configured for use as an internal or embedded SSD drive may look similar to the schematic of FIG. 1, with the primary difference being the location of the memory system 102 internal to the host. SSD drives may be in the form of discrete modules that are drop-in replacements for rotating magnetic disk drives.

One example of a commercially available SSD drive is a 32 gigabyte SSD produced by SanDisk Corporation. Examples of commercially available removable flash memory cards include the CompactFlash (CF), the MultiMediaCard (MMC), Secure Digital (SD), miniSD, Memory Stick, TransFlash, and microSD cards. Although each of these cards has a unique mechanical and/or electrical interface according to its standardized specifications, the flash memory system included in each is similar. These cards are all available from SanDisk Corporation, assignee of the present application. SanDisk also provides a line of flash drives under its Cruzer trademark, which are hand held memory systems in small packages that have a Universal Serial Bus (USB) plug for connecting with a host by plugging into the host's USB receptacle. Each of these memory cards and flash drives includes controllers that interface with the host and control operation of the flash memory within them.

Host systems that may use SSDs, memory cards and flash drives are many and varied. They include personal computers (PCs), such as desktop or laptop and other portable computers, cellular telephones, personal digital assistants (PDAs), digital still cameras, digital movie cameras and portable audio players. For portable memory card applications, a host may include a built-in receptacle for one or more types of memory cards or flash drives, or a host may require adapters into which a memory card is plugged. The memory system usually contains its own memory controller and drivers but there are also some memory-only systems that are instead controlled by software executed by the host to which the memory is connected. In some memory systems containing the controller, especially those embedded within a host, the memory, controller and drivers are often formed on a single integrated circuit chip.

The host system 100 of FIG. 1 may be viewed as having two major parts, insofar as the memory 102 is concerned, made up of a combination of circuitry and software. They are an applications portion 108 and a driver portion 110 that interfaces with the memory 102. In a PC, for example, the applications portion 108 can include a processor running word processing, graphics, control or other popular application software. In a camera, cellular telephone or other host system that is primarily dedicated to performing a single set of functions, the applications portion 108 includes the software that operates the camera to take and store pictures, the cellular telephone to make and receive calls, and the like.

The memory system 102 of FIG. 1 includes flash memory 112, and circuits 114 that both interface with the host to which the card is connected for passing data back and forth and control the memory 112. The controller 114 typically converts between logical addresses of data used by the host 100 and physical addresses of the memory 112 during data programming and reading.

FIG. 2 conceptually illustrates an organization of the flash memory cell array 112 (FIG. 1) that is used as an example in further descriptions below. The flash memory cell array 112 may include multiple memory cell arrays which are each separately controlled by a single or multiple memory controllers 114. Four planes or sub-arrays 202, 204, 206, and 208 of memory cells may be on a single integrated memory cell chip, on two chips (two of the planes on each chip) or on four separate chips. The specific arrangement is not important to the discussion below. Of course, other numbers of planes, such as 1, 2, 8, 16 or more may exist in a system. The planes are individually divided into groups of memory cells that form the minimum unit of erase, hereinafter referred to as erase blocks. Erase blocks of memory cells are shown in FIG. 2 by rectangles, such as erase blocks 210, 212, 214, and 216, located in respective planes 202, 204, 206, and 208. There can be hundreds or thousands of erase blocks in each plane.

As mentioned above, the erase block of memory cells is the unit of erase, the smallest number of memory cells that are physically erasable together. For increased parallelism, however, the erase blocks are operated in larger metablock units. One erase block from each plane is logically linked together to form a metablock. The four erase blocks 210, 212, 214, and 216 are shown to form one metablock 218. All of the cells within a metablock are typically erased together. The erase blocks used to form a metablock need not be restricted to the same relative locations within their respective planes, as is shown in a second metablock 220 made up of erase blocks 222, 224, 226, and 228. Although it is usually preferable to extend the metablocks across all of the planes, for high system performance, the memory system can be operated with the ability to dynamically form metablocks of any or all of one, two or three erase blocks in different planes. This allows the size of the metablock to be more closely matched with the amount of data available for storage in one programming operation.

The individual erase blocks are in turn divided for operational purposes into pages of memory cells, as illustrated in FIG. 3. The memory cells of each of the blocks 210, 212, 214, and 216, for example, are each divided into eight pages P0-P7. Alternatively, there may be 16, 32 or more pages of memory cells within each block. The page is the unit of data programming within an erase block, containing the minimum amount of data that are programmed or read at one time. However, in order to increase the memory system operational parallelism, such pages within two or more erase blocks may be logically linked into metapages. A metapage 302 is illustrated in FIG. 3, being formed of one physical page from each of the four erase blocks 210, 212, 214, and 216. The metapage 302, for example, includes the page P2 in each of the four blocks but the pages of a metapage need not necessarily have the same relative position within each of the blocks. A metapage is the maximum unit of programming.

Figure 4:
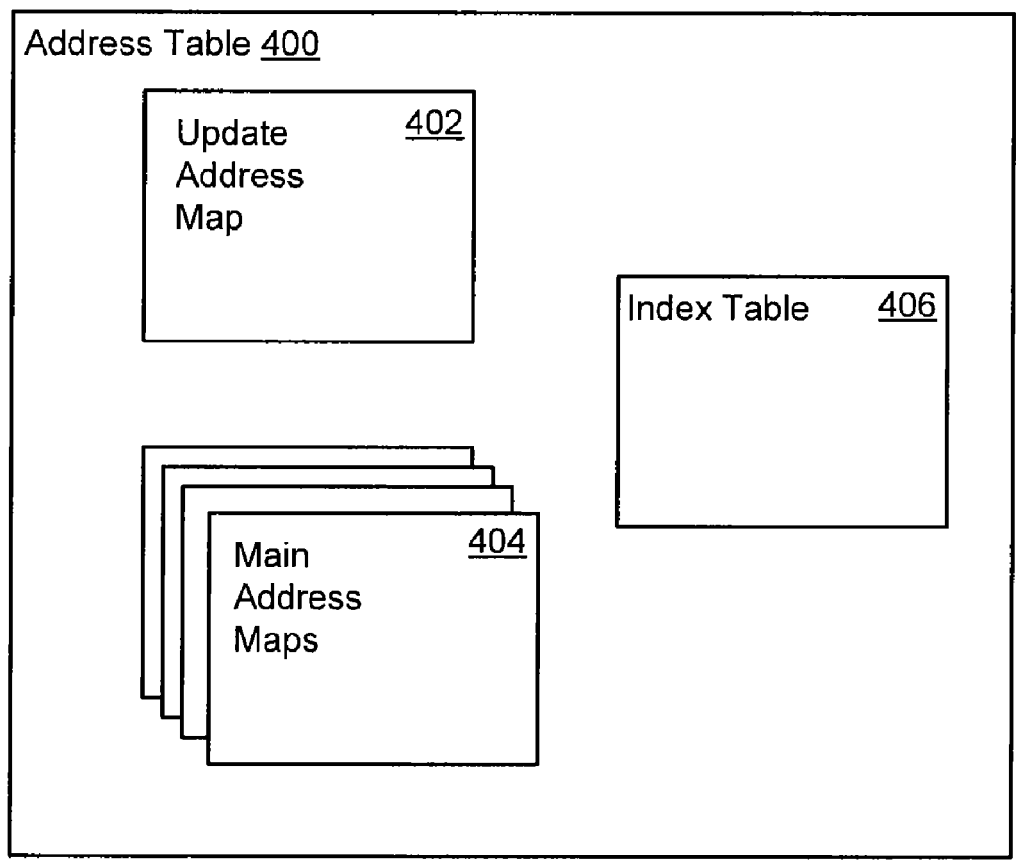
FIG. 4 illustrates an embodiment of an address table for mapping logical addresses to physical addresses.

FIG. 4 illustrates an embodiment of an address table 400 for mapping logical addresses to physical addresses. The address table 400 includes mapping information for mapping logical addresses to physical addresses using an update address map 402, main address maps 404, and an index table 406. The address table 400 may be included in the memory system 102, for example, for use by the controller 114 to translate logical addresses to physical addresses. The controller 114 may write, update, and/or delete mapping entries and index entries in the address table 400 when performing address translation. Referring to FIG. 1, address translation could be accomplished by driver 110. In this case the interface spanning 104 and 106 is a physical interface. Both the update address map 402 and the main address maps 404 contain mapping entries that map logical addresses to physical addresses in the memory device. The mapping entries in the maps 402 and 404 may include valid and invalid mapping entries such that there is a single valid mapping entry in either the update address map 402 or the main address maps 404 for a particular logical address.

In particular, when a host writes new mapping entries to the address table 400, the new mapping entries are written to the update address map 402. The new mapping entries are written in the next unwritten page of the update address map 402 and supersede mapping entries for the same logical addresses in the main address maps 404. In this case, the mapping entries for those logical addresses in the main address maps 404 are obsolete. The update address map 402 is periodically compacted to create unwritten space for writing subsequent mapping entries. The update address map 402 is updated in units of one page, the minimum write unit.

Although new mapping entries are first written to the update address map 402, the main address maps 404 are the primary location for mapping entries. The main address maps 404 are continuously consolidated with the update address map 402 such that the mapping entries in the update address map 402 are written to the main address maps 404. Following consolidation, the mapping entries in the main address maps 404 are valid and the mapping entries in the update address map 402 are no longer valid. The main address maps 404 are updated in multiples of one page, i.e., multiples of the minimum write unit.

The index table 406 contains index entries for correlating logical addresses with the mapping entries in the update address map 402 and the main address maps 404. The index table 406 is updated each time mapping entries are written to the update address map 402 or the main address maps 404. An index entry in the index table 406 contains the location of mapping entries in the update address map 402 and the main address maps 404. An index entry may also contain a pointer to a secondary index in the update address map 402, where the secondary index contains the specific location of the mapping entries in the update address map 402.

Figure 5:
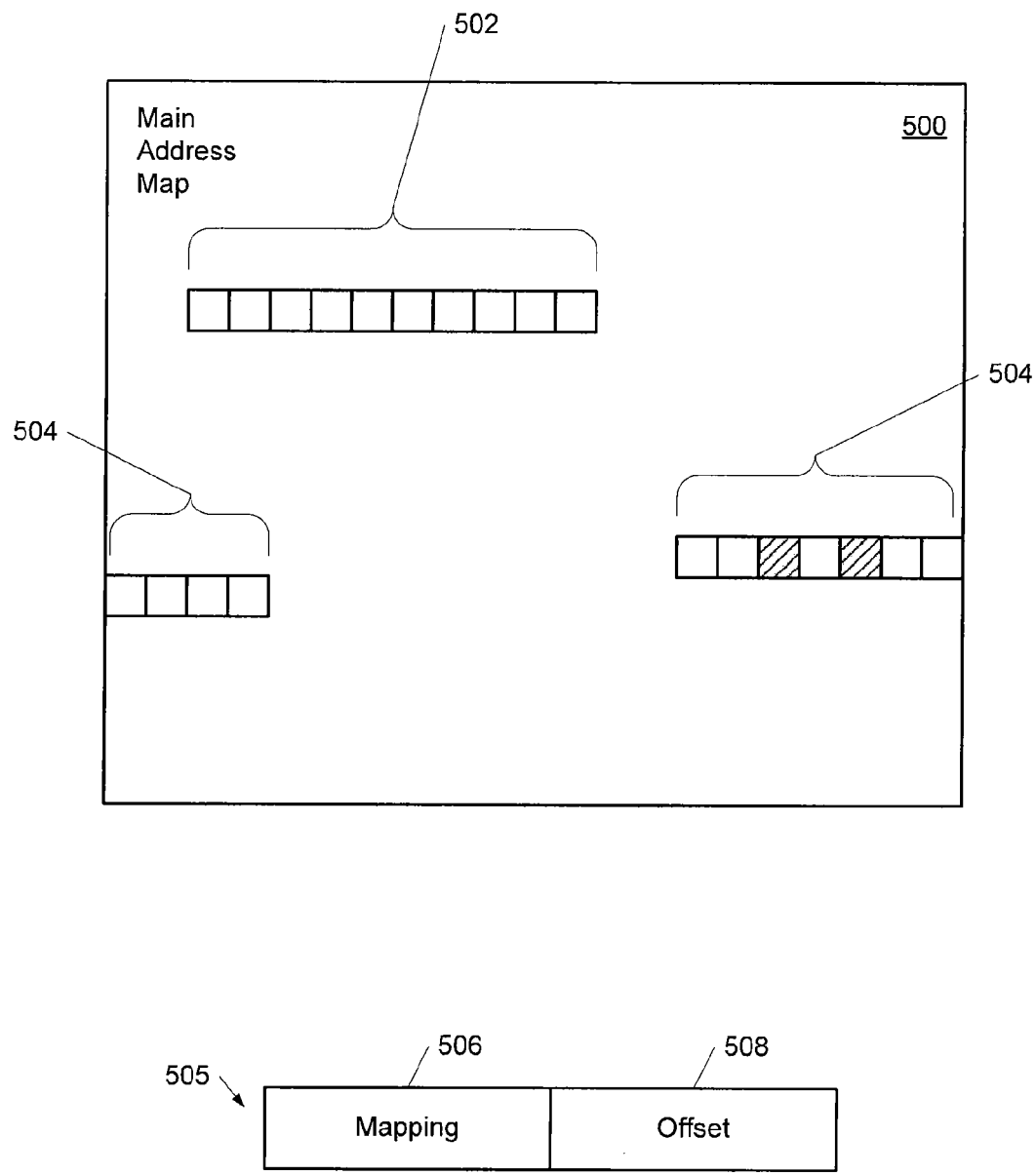
FIG. 5 illustrates an exemplary main address map including mapping entries for logical addresses to physical addresses.

FIG. 5 illustrates an exemplary main address map 500 including mapping entries for logical addresses to physical addresses. The main address map 500 is one of a plurality of main address maps 404 which are the primary location for mapping entries in the address table 400. In FIG. 5, two groups of mapping entries are shown in the main address map 500: main mapping sets 502 and 504. More main mapping sets are included within the main address map 500 but are not shown in FIG. 5. The main mapping sets in the main address map 500 relate to contiguous logical address runs which may consist of one or more logical groups.

Each main mapping set is a set of mapping entries for the physical addresses that are mapped to a logical address run. The mapping entries are ordered in each main mapping set by their offset within the logical address run. The number of main mapping sets in the main address map 500 varies according to the degree of fragmentation of the logical address run into physical address mappings. The mapping entries in the main mapping sets 502 and 504 include valid and obsolete entries. For example, in main mapping set 504, there are two mapping entries that are obsolete (shown as striped) because they are superseded by mapping entries in an update address map (not shown in FIG. 5). The obsolete entries are replaced with valid entries from the update address map during a consolidation operation.

An exemplary mapping entry 505 may include a mapping field 506 and an offset field 508. A main address map of 4 MB, for example, includes main mapping sets that are at most 10,240 bytes. Each main mapping set includes mapping entries of 5 bytes with a mapping field of 24 bits and an offset field of 11 bits. As noted previously, there are a possible 2048 physical address runs per logical group which, at 5 bytes per run necessary for mapping, results in the required 10,240 bytes per mapping set (i.e., per logical group) in the main address map. The main address map 500 may be stored in flash memory but some or all of the main address map 500 may be cached in random access memory for faster access to the mapping information.

Figure 6:
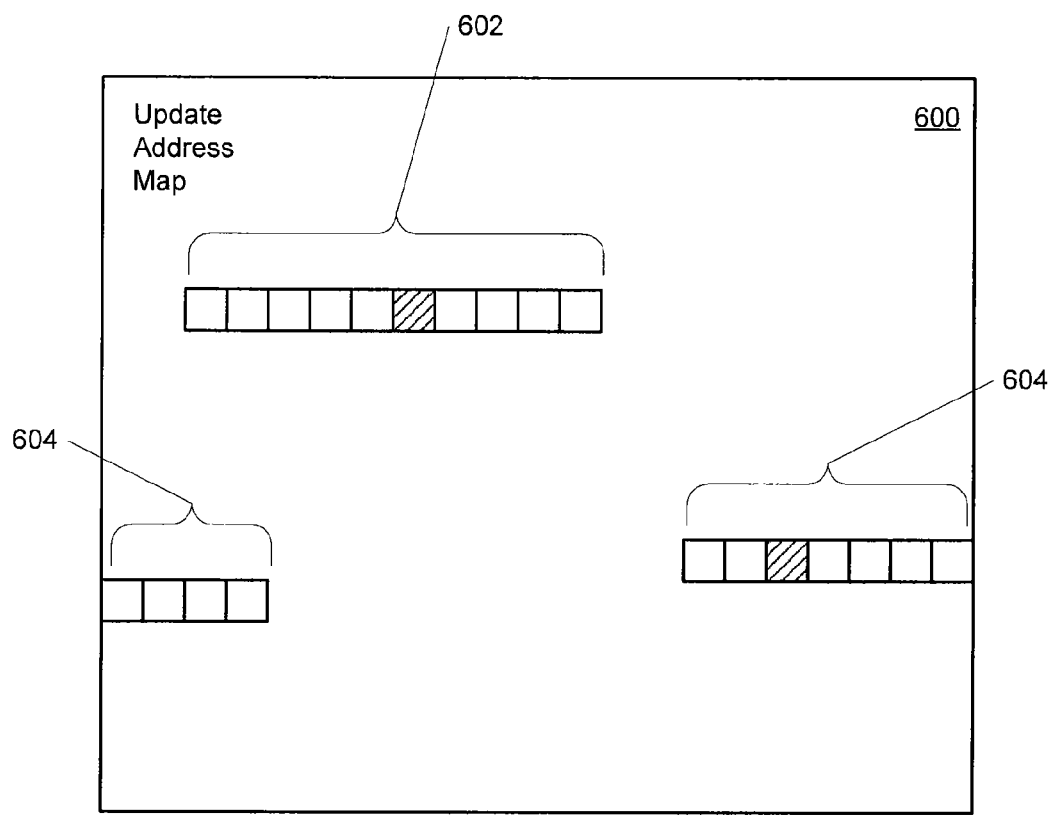
FIG. 6 illustrates an exemplary update address map including mapping entries for logical addresses to physical addresses.
Figure 6:
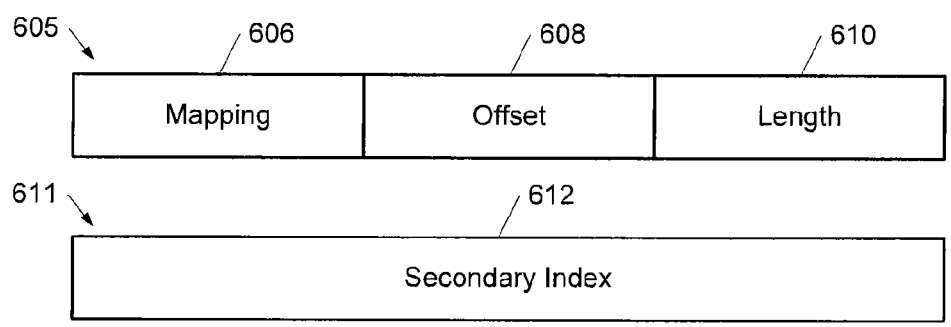

FIG. 6 illustrates an exemplary update address map 600 including mapping entries for logical addresses to physical addresses. Any modifications or additions to the mapping entries in the address table 400 are written to the update address map 600, not directly to the main address maps 404. The mapping entries in the update address map 600 supersede mapping entries in the main address maps 404 and are periodically consolidated with the main address maps 404.

In FIG. 6, two groups of mapping entries are shown in the update address map 600: update mapping sets 602 and 604. More update mapping sets are included within the update address map 600 but are not shown in FIG. 6. The update mapping sets in the update address map 600 relate to contiguous logical address runs. Each update mapping set is a set of mapping entries for the physical addresses that are mapped to a logical address run. The mapping entries are ordered in each update mapping set by their offset within the logical address run.

The mapping entries in the update mapping sets 602 and 604 include valid and obsolete entries. For example, in each of the update mapping sets 602 and 604, there is a mapping entry that is obsolete (shown as striped) because it has been consolidated with the corresponding mapping entry in the main address map. A mapping entry may also be obsolete if the mapping information has been updated or deleted due to changes in the underlying data. The update address map 600 is periodically compacted to compact valid update mapping sets and to create unwritten space for subsequent mapping entries written to the address table.

An exemplary mapping entry 605 may include a mapping field 606, an offset field 608, and a length field 610. An update address map of 4 MB, for example, includes update mapping sets that are at most 12,288 bytes. Each update mapping set includes mapping entries of 6 bytes with a mapping field of 24 bits, an offset field of 11 bits, and a length field of 11 bits. Alternatively, another exemplary mapping entry 611 in the update address map 600 may include a secondary index 612 that points to other mapping entries within the update address map 600 such as mapping entry 605. As discussed in more detail below, a secondary index 612 may be used where the index table contains a pointer to the mapping entry 611 instead of containing a specific location for update mapping sets in the update address map 600. Pointer 720 comprises an address within the update address map which is sufficient to indentify a secondary index and the no. of an entry with in the secondary index. The address may be a metapage address for example and the secondary index may be at a known location within the metapage. The secondary index contains entries for update mapping sets which are located within the same metapage as the secondary index. Each entry contains a location 716 and a length 718. The update address map 600 may be stored in flash memory but some or all of the update address map 600 may be cached in random access memory for faster access to the mapping information.

Figure 7:
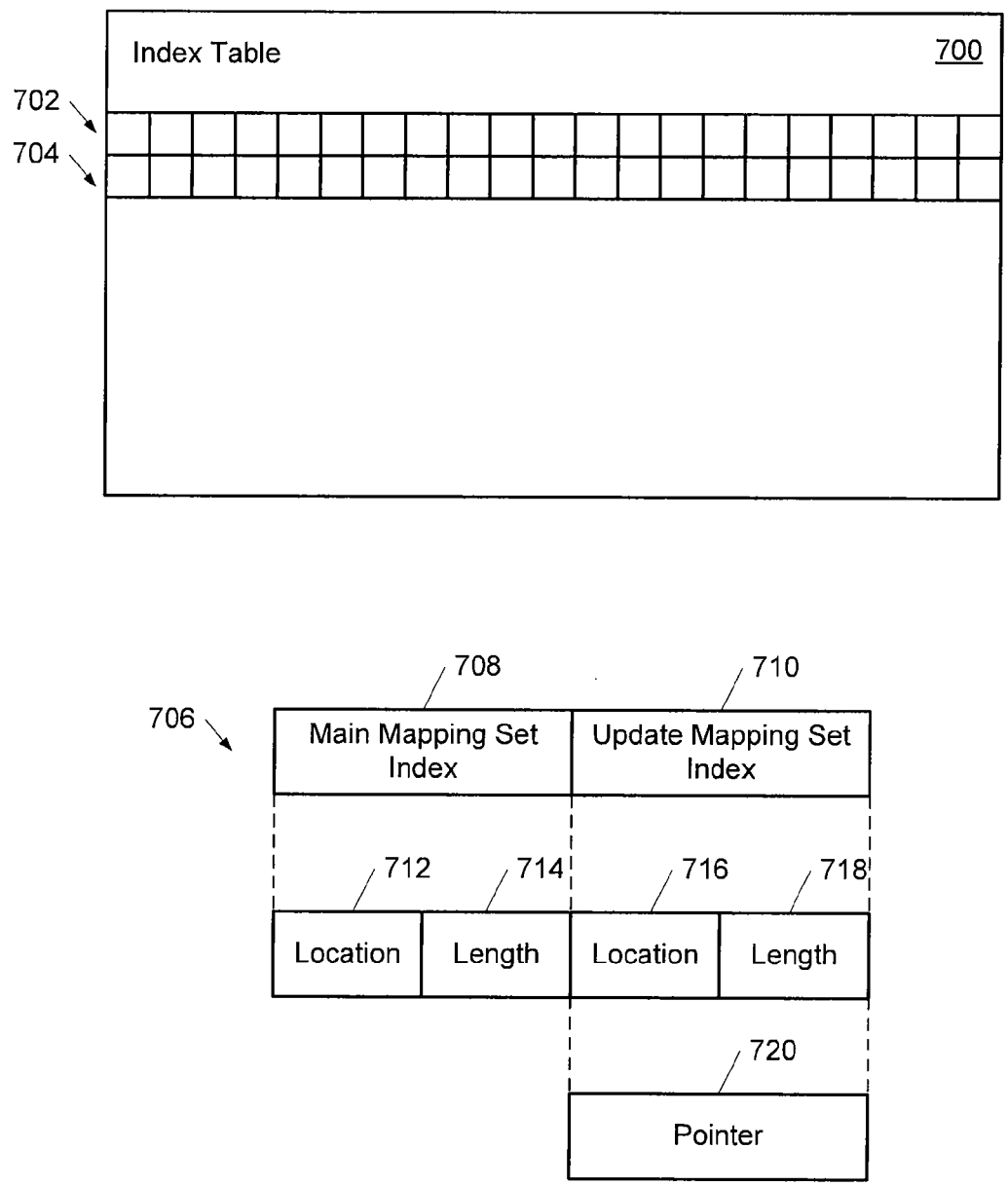
FIG. 7 illustrates an exemplary index table including index entries for the main address maps and update address map.

FIG. 7 illustrates an exemplary index table 700 including index entries for the main address maps and update address map. The index table 700 includes index pages 702 and 704 that contain index entries for every logical address run in logical address order. The controller 114 in the memory system 102, for example, may use the index entries in the index table 700 to locate the mapping entries in the update address map or main address map. More index pages may be included in the index table 700 but are not shown in FIG. 7. The index table 700 is updated following the writing of mapping entries to the update address map or consolidation of the update address map with the main address map.

An index entry 706 includes a main mapping set index field 708 and an update mapping set index field 710. The main mapping set index field 708 specifies the location 712 and length 714 of a main mapping set that relates to a particular logical address run in the main address map. The update mapping set index field 710 may specify the location 716 and length 718 of an update mapping set that relates to the particular logical address run in the update address map. An index table of 4 MB, for example, includes index pages that are 8 KB each including index entries that are 10 bytes. Each index entry includes the main mapping set index field 708 of 5 bytes and the update mapping set index field 710 of 5 bytes. The location 712 or 716 of the main mapping set or update mapping set, respectively, includes 7 bits for the address map address, 9 bits for the page address, and 11 bits for the mapping entry address. The length 714 or 718, or number of mapping entries in a set, is 11 bits.

Alternatively, the update mapping set index field 710 may specify a pointer 720 to a special mapping entry in the update address map, such as the mapping entry 611 including a secondary index 612 noted above with reference to FIG. 6. Using a pointer 720 may reduce the number of read operations needed when performing address translation with the mapping entries. If the pointer 720 is set, the memory system knows if a valid mapping entry is present in the update address map because the pointer 720 is set. If the pointer 720 is set, then the locations of the valid mapping entries in the update address map are subsequently read from the secondary index 612 in the update address map. If the pointer 720 is not set, then the memory system knows there are no valid mapping entries in the update address map and does not need to read the update address map because all of the valid mapping entries are contained in the main address map. The memory system would read the mapping entries from the main address map only.

In contrast, an update mapping set index field 710 including a location 716 and length 718 may require more read operations to perform address translation using the mapping entries. If the location 716 and length 718 are set, then the memory system proceeds to read the update mapping set in the update address map. However, the update mapping set may not necessarily contain the valid mapping entries for the specific logical addresses that are to be translated because the related mapping entries may be obsolete. In this case, the main mapping set in the main address map must be read to obtain the valid mapping entries for those specific logical addresses.

Figure 8:
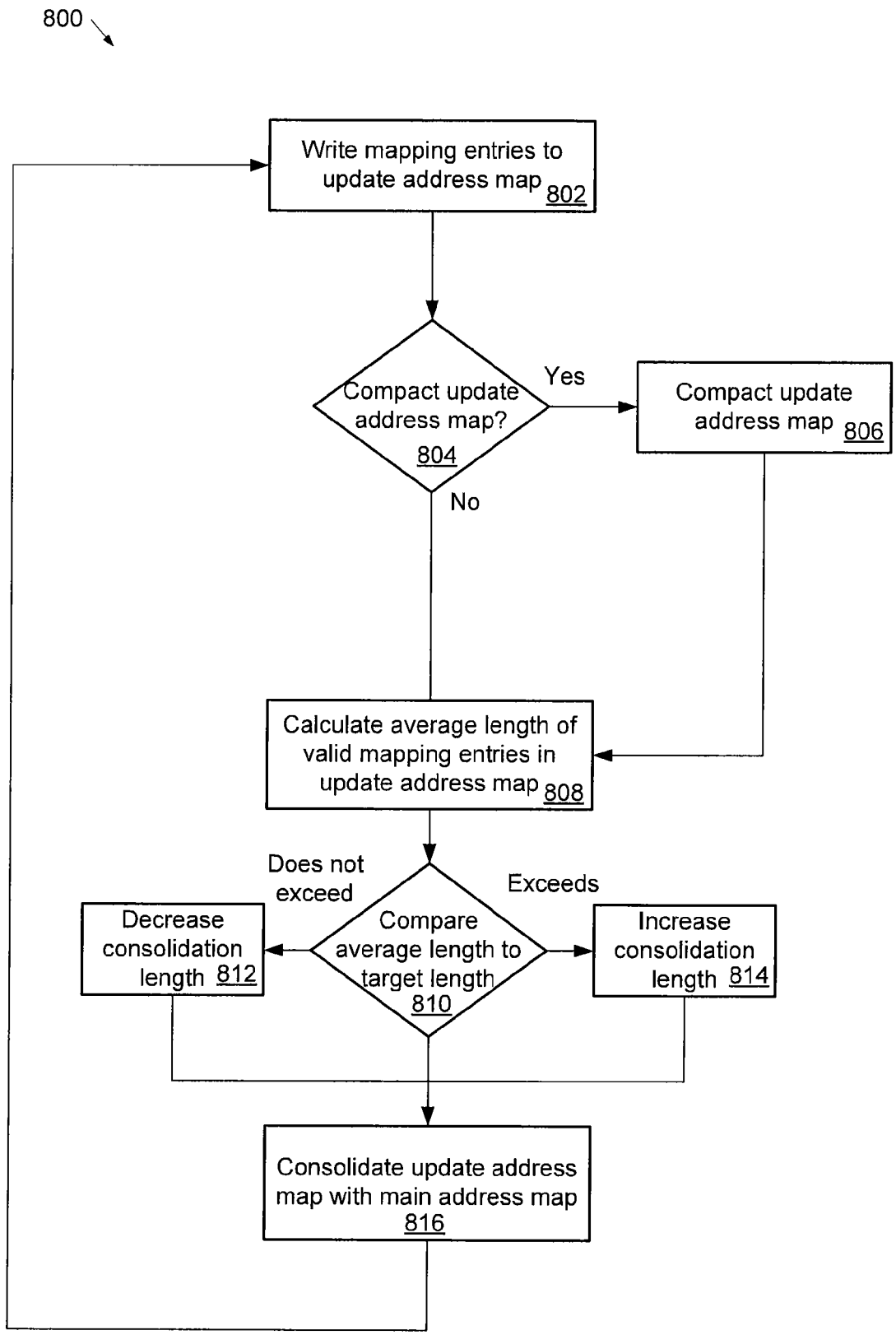
FIG. 8 is a flow diagram illustrating a method of maintaining an address table for mapping logical addresses to physical addresses.

FIG. 8 is a flow diagram illustrating a method 800 of maintaining an address table for mapping logical addresses to physical addresses. The method 800 writes mapping entries to an update address map, compacts the update address map, and consolidates the update address map with a main address map. The amount of consolidation is also adjusted by the method 800. The controller 114 in the memory system 102 may implement the method 800, for example. Each of the steps described in FIG. 8 for the method 800 may be performed alone or in combination with other steps.

At step 802, mapping entries are written to the update address map 402. The host may write new mapping entries to the mapping table 400 when there is new data or if data is modified or deleted. The incoming mapping entries are written to the update address map 402 instead of directly to the main address map 404. The incoming mapping entries contain mapping information that supersedes mapping entries that already exist in the update address map 402 or the main address map 404. The incoming mapping entries are written to the next unwritten page in the update address map 402, regardless of whether they fill the page. If the incoming mapping entries do not fill the page, then null data may be appended to the page for padding.

When the incoming mapping entries are written to the update address map 402, all valid mapping entries already in the update address map 402 that are related to the same logical address run are read and re-written together with the incoming mapping entries as an update mapping set. The mapping entries in the update mapping set are in order of their offset within the logical address run. The update mapping set may span multiple pages of the update address map 402.

FIGS. 12A-C illustrate exemplary update address maps undergoing writing of mapping entries prior to any compaction operation. In the update address map of FIG. 12A, the striped sections denote update mapping sets containing valid update mapping entries. If incoming mapping entries correspond to a logical address run "1" that does not yet have any mapping entries in the update address map, the incoming mapping entries are written to the next unwritten page location, as shown by the striped update mapping set denoted "1" in the update address map of FIG. 12B. Because the striped update mapping set "1" does not fill the page in FIG. 12B, null data is appended to fill the page.

FIG. 12C shows the resulting update address map after new and/or updated mapping entries for logical address run 1 are written to the update address map. The mapping entries in the previously written update mapping set 1 (with horizontal stripes in FIG. 12C) are read and re-written with the new incoming mapping entries to form a new striped update mapping set 1. New mapping entries for logical address runs 2 and 3, which did not yet have existing mapping entries in the update address map, are also written to the update address map shown in FIG. 12C. New and/or updated mapping entries for logical address run 4 are also written to the update address map in FIG. 12C. As with the logical address run 1, the mapping entries in the previously written update mapping set 4 are read and re-written with the new incoming mapping entries to form a new striped update mapping set 4. The update mapping set 4 spans two pages of the update address map in FIG. 12C.

Referring again to the method 800 shown in FIG. 8, following writing of the mapping entries to the update address map at step 802, it is determined at step 804 whether to compact the update address map 402. The update address map 402 may be compacted when the update address map 402 meets a compaction criterion. The compaction criterion may include whether the update address map 402 has reached full capacity or has reached a predetermined capacity less than full capacity. If the compaction criterion is met at step 804, the update address map 402 is compacted at step 806. Compacting the update address map 402 at step 806 creates unwritten space for subsequently written mapping entries, as well as compacts the existing mapping entries to occupy less space in the update address map 402. Obsolete mapping entries in the update address map 402 are removed during a compaction operation.

If the compaction criterion is not met at step 804, the length of consolidation is reviewed and may be adjusted at steps 808-814. The length of consolidation, which is the range of logical address space consolidated, is dependent on the average length of compacted valid update mapping entries in the update address map 402 following a compaction operation. A compaction operation reads and re-writes the valid mapping entries in the update address map 402 such that the valid mapping entries are contiguously placed at the beginning of the update address map 402. The length of the compacted valid mapping entries is influenced by: (1) the length of compacted valid mapping entries at the start of the prior compaction operation; (2) the average number of mapping entries written per page in the update address map 402 during the prior compaction operation; and (3) the number of mapping entries in the update address map 402 that are made obsolete when consolidation occurs.

The length of consolidation is adjusted so that the length of compacted valid mapping entries after a compaction operation is maintained to be as close as possible to a target length. The target length of compacted valid mapping entries may be 50% of the total length of the update address map, for example, or may be another target length. The target length is selected to balance the number of valid mapping entries in the update address map for efficient consolidation operations and the amount of unwritten space for writing future mapping entries in the update address map. At step 808, the average length of compacted valid update mapping entries is calculated. The computed average length may include a rolling of average of lengths of compacted valid update mapping entries over a number of previous compaction operations. For example, the rolling average over the last ten previous compaction operations may be calculated at step 808.

At step 810, the computed average length is compared to the predetermined target length. If the computed average length does not exceed the target length at step 810, then the method 800 continues to step 812 and the consolidation length is decreased. However, if the computed average length exceeds the target length at step 810, then the method 800 continues to step 814 and the consolidation length is increased. The method 800 proceeds to step 816 where consolidation of the update address map 402 and the main address maps 404 is performed. Consolidation continuously occurs throughout each of the main address maps 404 by rewriting the main address maps 404 with corresponding valid mapping entries from the update address map 402. The consolidation process is performed in bursts that include an integral number of pages of a main address map. If the last page written during a consolidation burst does not have enough mapping entries to fill a page, then null data may be appended to pad the page.

By adjusting the consolidation length and consolidating update address map data in this fashion, there will be an optimum amount of unwritten space in the update address map 402 for mapping entries to be written to. If there are more mapping entries to write, then the method 800 returns to step 802 to write the incoming mapping entries to the update address map.

Figure 9:
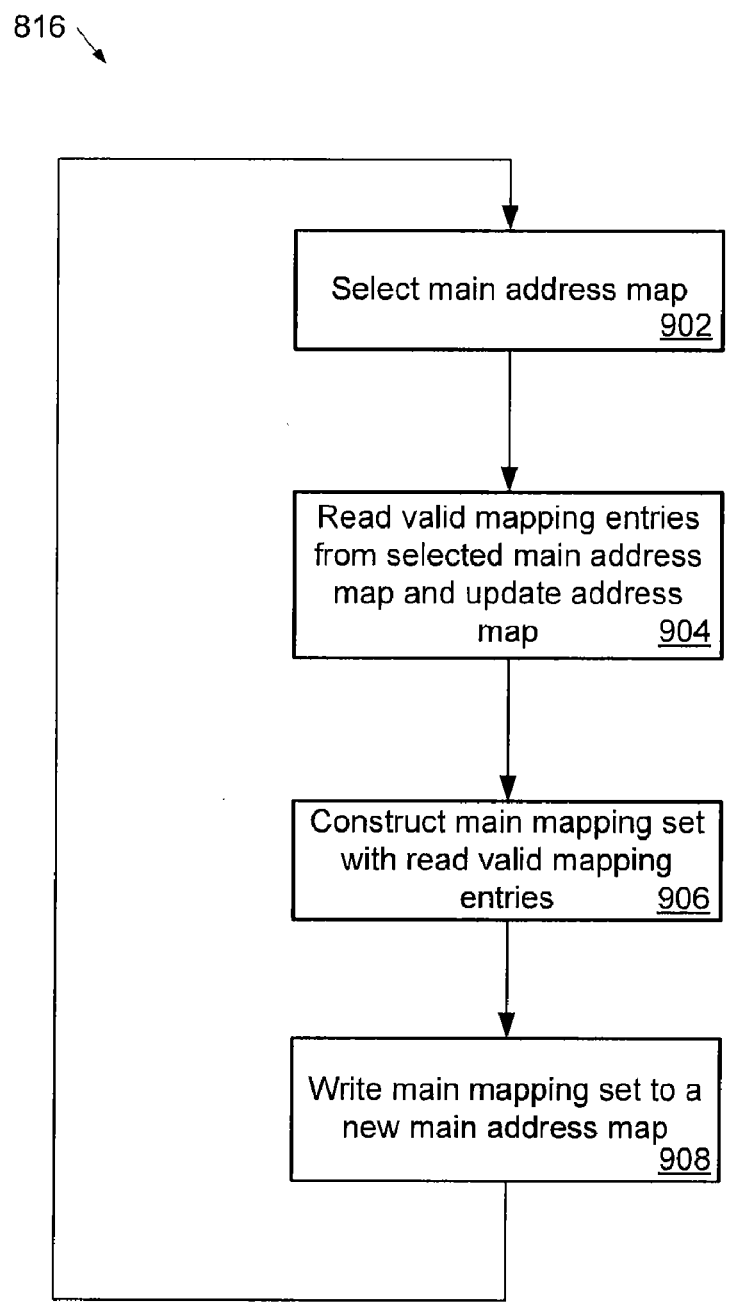
FIG. 9 is a flow diagram illustrating a method of consolidating the update address map and the main address maps.

FIG. 9 is a flow diagram illustrating a method 816 of consolidating the update address map and the main address maps. The method 816 corresponds to step 816 of FIG. 8 as described above. Consolidation of the main address maps 404 and the update address map 402 is performed continuously. A main address map of the main address maps 404 is selected at step 902. The selected main address map may be selected in order of logical address relative to the other logical addresses.

At step 904, the valid mapping entries are read from the selected main address map and the update address map 402. The locations of the valid mapping entries are known by reading the index table 406. In particular, index entries related to the logical address run being consolidated are read from the index table 406. The valid mapping entries are read from the selected main address map and the update address map 402, based on the index entries. As discussed previously, the index entry may contain a main mapping set index 708 and an update mapping set index 710, each with a specified location and length of valid mapping sets in the selected main address map and the update address map 402. The update mapping set index 710 can alternatively contain a pointer 720 specifying the location of a secondary index 612 instead of the location of an update mapping set.

Main mapping sets are constructed at step 906 from the valid mapping entries read at step 904. The main mapping sets are constructed in logical address order. At step 908, the constructed main mapping sets are written to a new main address map of the main address maps 404. The selected main address map is now designated as unwritten and can be erased and used for subsequent writing of other data. The new main address map does not necessarily need to span the same logical address range as the original selected main address map. Because the consolidation process operates in logical address order, it is not necessary to keep the boundaries between main address maps at the same logical address. If there is unwritten space at the end of a consolidated main address map, consolidated mapping entries from future consolidation operations may be written there. Accordingly, consolidated mapping entries may span more than one main address map.

Figure 10A:
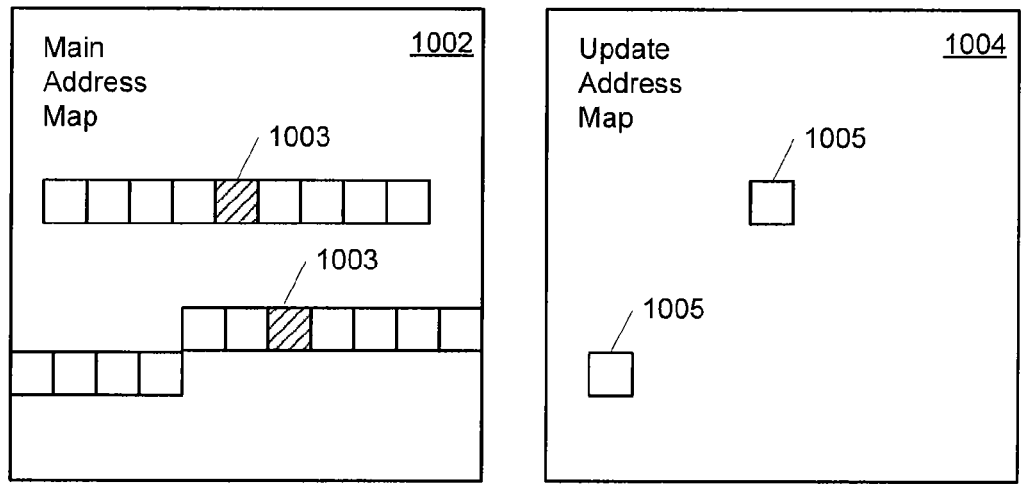
FIGS. 10A and 10B illustrate exemplary main address maps and update address maps undergoing consolidation.
Figure 10B:
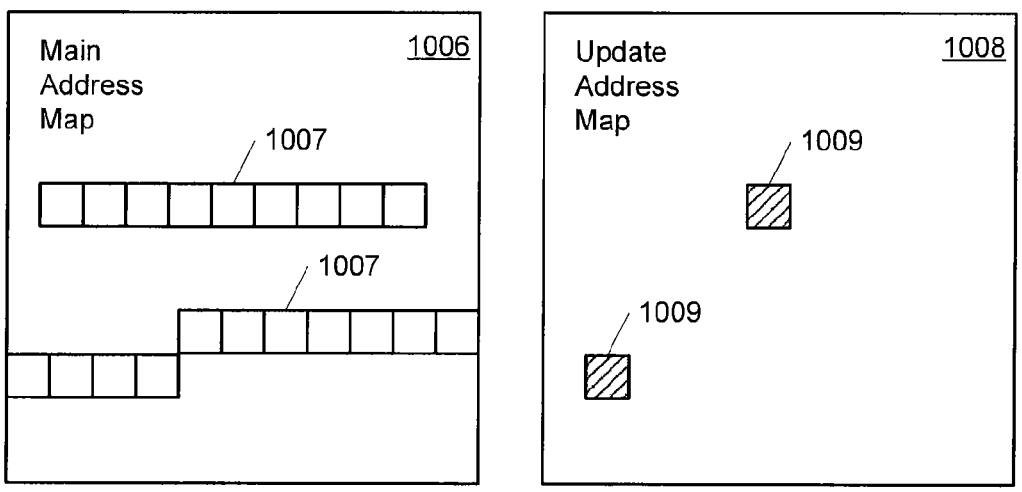

As an example, FIGS. 10A and 10B illustrate the selected main address map and the update address map before and after a consolidation operation, respectively. In FIG. 10A, the selected main address map 1002 contains two obsolete mapping entries 1003. The obsolete mapping entries 1003 are superseded by valid mapping entries 1005 in the update address map 1004. In FIG. 10B, after consolidation, the new main address map 1006 contains all valid mapping entries, including the now-valid mapping entries 1007. Accordingly, the update address map 1004 in FIG. 10B includes two now-obsolete mapping entries 1009 that had been valid before the consolidation operation.

Figure 11:
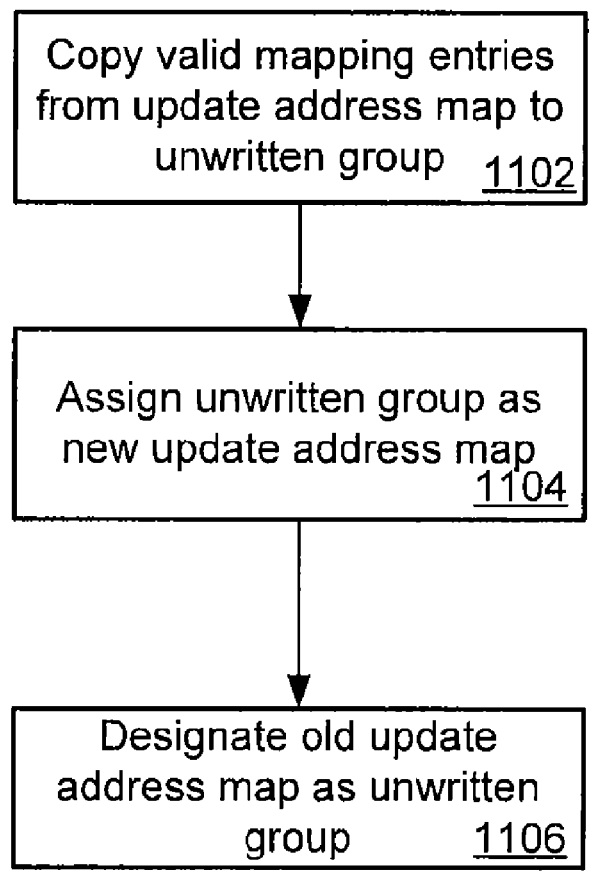
FIG. 11 is a flow diagram illustrating a method of compacting the update address map.

FIG. 11 is a flow diagram illustrating a method 806 of compacting the update address map. The method 806 corresponds to step 806 of FIG. 8 as described above. Compaction of the update address map occurs periodically when a compaction criterion is met, such as when the update address map is full or has reached another predetermined capacity. Compaction may be performed independently or simultaneously with consolidation of the main address maps. At step 1102, valid mapping entries in the update address map are copied to an unwritten block or metablock. The valid mapping entries in the update address map may be identified from index entries in the index table. The formerly unwritten block or metablock is assigned as the new update address map at step 1104. At step 1106, the old update address map is designated as an unwritten block or metablock, which may be used for subsequent writing of other data.

As an example, FIGS. 13A and 13B illustrate an update address map undergoing compaction. In FIG. 13A, the update address map has not yet been compacted (for consistency, FIG. 13A is identical to FIG. 12C described previously). The update address map in FIG. 13A contains striped valid mapping entries, including mapping entries for logical address runs 1, 2, 3, and 4. In addition, the update address map in FIG. 13A includes two obsolete sets of mapping entries for logical address runs 1 and 4 (denoted by horizontal stripes). After compaction is performed, the update address map appears as shown in FIG. 13B. Only valid mapping entries are contained in the new update address map of FIG. 13B, including the valid mapping entries for logical address runs 1, 2, 3, and 4 of FIG. 13A. The obsolete mapping entries for logical address runs 1 and 4 are not copied to the new update address map.

Methods have been disclosed for maintaining an address table in a memory device for mapping logical addresses to physical addresses using a main address map and an update address map. Mapping entries in the main address map are continuously consolidated with mapping entries in the update address map. The update address map is periodically compacted to create additional space for subsequently written mapping entries. The length of consolidation of the main address map may be adjusted based on the average length of compacted mapping entries in the update address map. Overhead due to maintenance of the address table is reduced when using these methods. It is therefore intended that the foregoing detailed description be regarded as illustrative rather than limiting, and that it be understood that it is the following claims, including all equivalents, that are intended to define the spirit and scope of this invention.

We claim:

1. A method of maintaining an address table in a memory device, the address table comprising a plurality of main address maps and an update address map, the method comprising:

(A) selecting a first main address map from the plurality of main address maps, the first main address map relating to a first logical address range;

(B) reading valid main mapping entries from the first main address map and valid update mapping entries from the update address map, where:

the valid main mapping entries and the valid update mapping entries specify an address mapping of logical address runs to physical address runs in the memory device; and the valid update mapping entries supersede corresponding invalid main mapping entries;

(C) constructing a main mapping set, the main mapping set comprising the valid main mapping entries and the valid update mapping entries;

(D) writing the main mapping set to a second main address map of the plurality of main address maps;

compacting the update address map when the update address map meets a compaction criterion;

calculating an average length of the valid update mapping entries based on a predetermined number of previous executions of the compacting step;

comparing the average length to a target length; and performing steps (A)-(D) for a range of logical addresses based on the comparison.

2. The method of claim 1, where selecting the first main address map comprises:

identifying the first main address map based on an order of the first logical address range relative to other logical address ranges.

3. The method of claim 1, where performing steps (A)-(D) for the range of logical addresses based on the comparison comprises:

increasing the range if the average length exceeds the target length; and decreasing the range if the average length does not exceed the target length.

4. The method of claim 1, where constructing the main mapping set comprises invalidating the valid update mapping entries in the update address map.

5. The method of claim 1, further comprising reading an index entry from an index table for a logical group in the first logical address range, comprising:

reading a main mapping set index in the index entry, the main mapping set index comprising:

a location of the main mapping set in the first main address map; and a length of the main mapping set; and reading an update mapping set index in the index entry, the update mapping set index comprising:

a location of an update mapping set in the update address map, where the update mapping set comprises the valid update mapping entries; and a length of the update mapping set.

6. The method of claim 5, where writing the main mapping set comprises writing the index entry to the index table for the logical group, and where writing the index entry comprises:

writing a main mapping set index in the index entry, the main mapping set index comprising:

a location of the main mapping set in the second main address map; and a length of the main mapping set; and clearing an update mapping set index in the index entry.

7. The method of claim 1, further comprising reading an index entry from an index table for a logical group in the first logical address range, comprising:

reading a main mapping set index in the index entry, the main mapping set index comprising:

a location of the main mapping set in the first main address map; and a length of the main mapping set; and reading an update mapping index set pointer in the index entry, the update mapping index set pointer comprising:

a location of an update mapping set index in the update address map, where the update mapping set index comprises:

a location of an update mapping set in the update address map, where the update mapping set comprises the valid update mapping entries; and a length of the update mapping set.

8. The method of claim 1, where writing the main mapping set comprises padding the main mapping set with null data if the main mapping set does not fill the second main address map.

9. The method of claim 1, where writing the main mapping set comprises writing the main mapping set to the second main address map relating to a second logical address range that at least partially overlaps the first logical address range.

10. The method of claim 1, where writing the main mapping set comprises writing the main mapping set to the second main address map in logical group order.

11. The method of claim 1, where:

reading the valid main mapping entries and the valid update mapping entries comprises:

reading the valid main mapping entries from the first main address map stored in a non-volatile memory; and reading the valid update mapping entries from the update address map stored in the non-volatile memory; and writing the main mapping set comprises writing the main mapping set to the second main address map stored in the non-volatile memory.

12. A method of maintaining an address table in a memory device, the address table comprising a plurality of main address maps and an update address map, the method comprising:

(A) writing a mapping entry to the update address map, where the mapping entry specifies an address mapping to a physical address run in the memory device;

(B) determining whether the update address map meets a compaction criterion; and (C) if the update address map meets the compaction criterion:

copying the valid update mapping entries in the update address map to a first unwritten block or metablock in the memory device, where the valid update mapping entries are copied contiguously and in address order;

assigning the first unwritten block or metablock as a new update address map; and designating the update address map as a second unwritten block or metablock;

calculating an average length of the valid update mapping entries based on a predetermined number of previous executions of step (C);

comparing the average length to a target length; and consolidating the plurality of main address maps with the update address map over a range of logical addresses based on the comparison.

13. The method of claim 12, where determining whether the update address map meets the compaction criterion comprises determining whether the update address map has reached full capacity.

14. The method of claim 12, where determining whether the update address map meets the compaction criterion comprises determining whether the update address map has reached a predetermined capacity less than the full capacity.

15. The method of claim 12, where performing the step of consolidating further comprises:
increasing the range if the average length exceeds the target length; and
decreasing the range if the average length does not exceed the target length.

16. The method of claim 12, where writing the mapping entry to the update address map comprises:
reading the valid update mapping entries in the update address map; and
writing an update mapping set to the update address map, the update mapping set comprising the mapping entry and the valid update mapping entries.

17. The method of claim 16, where writing the update mapping set comprises padding the update mapping set with null data if the update mapping set does not fill a page of the update address map.

18. The method of claim 12, further comprising reading an index entry from an index table for a logical group in a first logical address range, comprising:
reading an update mapping set index in the index entry, the update mapping set index comprising:
a location of an update mapping set in the update address map, where the update mapping set comprises the valid update mapping entries; and
a length of the update mapping set.

19. The method of claim 18, where copying the valid update mapping entries comprises writing the index entry to the index table for the logical group, where writing the index entry comprises:
updating an update mapping set index in the index entry, the update mapping set index comprising:
a location of an update mapping set in the update address map; and
a length of the update mapping set.

20. The method of claim 12, further comprising reading an index entry from an index table for a logical group in a first logical address range, comprising:
reading an update mapping set index pointer in the index entry, the update mapping set index pointer comprising:
a location of an update mapping set index in the update address map, where the update mapping set index comprises:
a location of an update mapping set in the update address map, where the update mapping set comprises the valid update mapping entries; and
a length of the update mapping set.

21. The method of claim 12, where:
writing the mapping entry to the update address map comprises writing the mapping entry to the update address map stored in the non-volatile memory; and
copying the valid update mapping entries in the update address map to the first unwritten block or metablock in the memory device comprises writing the valid update mapping entries to the first unwritten block or metablock in the non-volatile memory.

22. A memory device comprising:
a memory having an address table, the address table comprising a plurality of main address maps and an update address map; and
a controller in communication with the memory, the controller configured to:
(A) select a first main address map from the plurality of main address maps, the first main address map relating to a first logical address range;
(B) read valid main mapping entries from the first main address map and valid update mapping entries from the update address map, wherein the valid main mapping entries and the valid update mapping entries specify an address mapping of logical address runs to physical address runs in the memory device, and wherein the valid update mapping entries supersede corresponding invalid main mapping entries;
(C) construct a main mapping set, the main mapping set comprising the valid main mapping entries and the valid update mapping entries;
(D) write the main mapping set to a second main address map of the plurality of main address maps;
compact the update address map when the update address map meets a compaction criterion;
calculate an average length of the valid update mapping entries based on a predetermined number of previous executions of compacting the update address map;
compare the average length to a target length; and
perform steps (A)-(D) for a range of logical addresses based on the comparison.

23. The device of claim 22, wherein the controller is further configured to, based on the comparison:
increase the range if the average length exceeds the target length; and
decrease the range if the average length does not exceed the target length.

* * * * *